Nov. 5, 1940.    J. M. CAPEN    2,220,620
BRAKE CONTROL UNIT FOR FLUID-OPERATED BRAKES
Filed Dec. 23, 1939
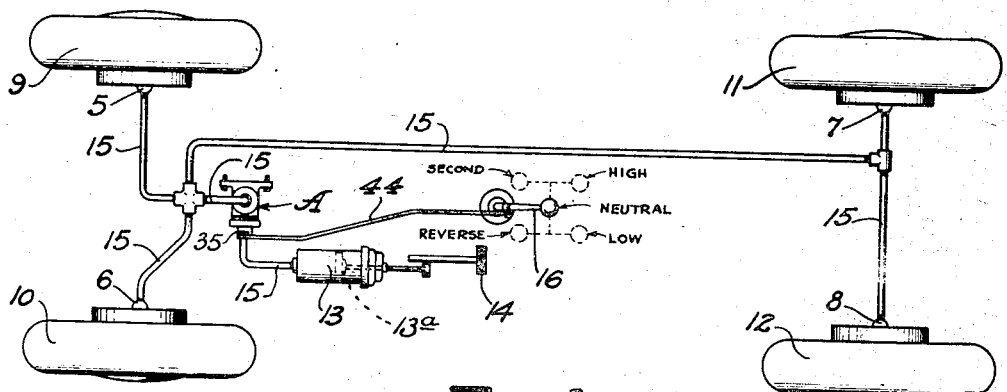
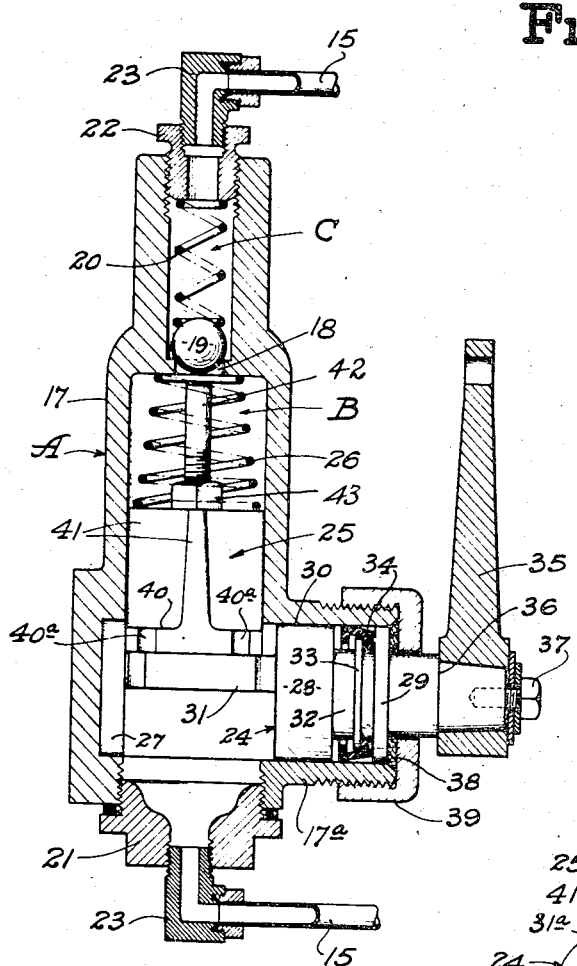
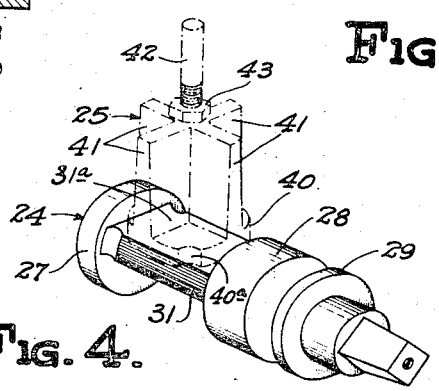
INVENTOR.
JOHN M. CAPEN
BY Hull, West & Chilton
ATTORNEYS.

Patented Nov. 5, 1940

2,220,620

UNITED STATES PATENT OFFICE 2,220,620

BRAKE CONTROL UNIT FOR FLUID-OPERATED BRAKES

John M. Capen, Lakewood, Ohio, assignor of one-half to Daniel R. Bohm, Jr., Cleveland, Ohio Application December 23, 1939, Serial No. 310,669

13 Claims. (Cl. 192—4)

This invention relates to a brake control unit for fluid operated brakes of the type now commonly installed upon motor vehicles.

In brake systems of this type the conventional practice is to supply each wheel with its own brake cylinder and piston, the latter being actuated by a fluid pressure medium, such as oil, which is supplied from a master cylinder in response to the depression of the usual service brake pedal. Accordingly, when an operator desires to apply the brakes of a vehicle equipped with fluid pressure brakes, he merely depresses the service brake pedal and, as long as such pedal is maintained depressed, the brakes are held in their applied position. If the operator is required to leave the motor vehicle frequently, as is the case with operators of vehicles such as bakery trucks, milk trucks, grocery trucks and similar delivery vehicles requiring frequent stops, it becomes necessary to employ the customary emergency brake mechanism for each stop in order to retain the brakes in their applied position during the absence of the operator.

It is an object of the present invention, therefore, to provide a brake control unit which will retain the fluid pressure brakes applied without the necessity for operating the emergency brake system.

Another object of the present invention is to utilize the gear shift lever of a motor vehicle for operating my improved brake control unit without in any way interfering with or changing the usual operation of such lever.

Still another object of the present invention is to provide a construction of the brake control unit wherein the brakes are maintained in applied position after operation of the service brake pedal only when the gear shift lever is in the neutral position and are rendered inoperative whenever the gear shift lever is shifted to any gear selecting position in a manner presently to be described.

With these and other objects in view, the invention consists in the construction and novel combination of parts fully described hereinafter, illustrated in the accompanying drawing, and finally pointed out in the claims, it being understood that various changes in the form, proportions, size and minor details of construction within the scope of the claims may be resorted to without departing from the spirit of the invention.

In the drawing forming part hereof, Fig. 1 is a diagrammatic plan view illustrating the fluid pressure brake system of a motor vehicle employing my improved brake control unit; Fig. 2 is a view partly in vertical section and partly in elevation of the control unit; Fig. 3 is a view similar to Fig. 2, the section however being taken at right angles to Fig. 2 and parts being omitted because of lack of space; and Fig. 4 is an isometric view of the rock shaft and valve actuator, the latter being illustrated by dot and dash lines in order to more clearly show its association with the rock shaft.

In the embodiment of my invention as illustrated, and which shows a prefered construction, reference numerals 5, 6, 7 and 8 designate generally the individual brake cylinders for the wheels 9, 10, 11 and 12, respectively, of a motor vehicle. These cylinders are energized by fluid pressure created within a master cylinder 13 by the piston 13ᵃ in a manner familiar and well known to those skilled in the art, the piston 13ᵃ being actuated when the service brake pedal 14 is depressed; and therefore it is unnecessary to describe these parts in detail. It will be noted, however, that the master cylinder 13 is connected with the brake cylinders by a suitable fluid conduit or piping 15. My improved brake control unit, designated as a whole by the reference character A, is inserted within the conduit 15 between the master cylinder and the wheel brake cylinders, as clearly shown in Fig. 1, and is under the control of the gear shift lever 16, in a manner presently to be disclosed.

Referring now in detail to my improved brake control unit and with reference to Fig. 2, the numeral 17 designates a housing provided interiorly with a valve seat 18 and a valve 19 which latter is normally held upon its seat 18 by a spring 20. The valve 19 and seat 18 divide the interior of the housing 17 into two cylindrical chambers, B and C, and a plug 21 is threaded into the open end of the larger-diameter chamber B while a smaller plug 22 is threaded into the open end of the smaller-diameter chamber C. Each plug is suitably drilled and threaded to receive a nipple 23 which connects the conduit 15 with the chambers B and C of the housing.

The means for holding the valve 19 in open position, when desired, comprises a rock shaft 24, which extends into the housing 17 through a lateral fitting 17ᵃ adjacent to the lower end of the chamber B, and the valve actuator 25 the base of which is normally urged against the shaft by a spring 26. This rock shaft 24 embodies a plurality of bearing members 27, 28 and 29 which have a running fit within seats therefor in the housing 17 and in the base 30 of the lateral fitting. Bearing members 27 and 28 are in spaced apart relation relatively to each other but are joined by a flat bar 31 forming that part of the rock shaft which moves the valve actuator 25. The rock shaft is further provided with a reduced neck 32 and an annular flange 33 beyond the bearing member 28, to receive and retain a tapered annular rubber gasket 34. This gasket is utilized as a seal against the escape of fluid from the housing around the rock shaft. The exposed end of the rock shaft is reduced and squared to receive a crank arm 35 which is retained upon the squared end against the shoulder 36 of said shaft, preferably by a bolt 37, as shown. An additional seal for the rock shaft is here shown in the form of a packing 38 located between the bearing member 29 and the shouldered cap 39 which closes the outer end of the fitting 17a and through which the outer end of the rock shaft extends.

An important function of my improved brake control unit is the holding of the rock shaft 24 against axial displacement by locating the bearing member 27 behind the flange 40 of the valve actuator 25, as shown in Figs. 2 and 3. The valve actuator 25 is best illustrated in Fig. 4 and comprises a body having a horizontal base flange 40 and upstanding ribs or vanes 41 carried by said flange and in sliding engagement with the wall of the chamber B and a vertically extending pin 42 which is adjustably carried by the said body and which is retained in any desired adjusted position as, for example, by a lock nut 43. The flange 40 is provided with peripheral recesses 40a which permit the passage of brake fluid past said flange.

When the crank arm 35 is in a vertical position, as shown in Fig. 2, the flange 40 of the valve actuator 25 will be seated upon the top surface 31a of the bar 31 and will be resiliently held in this position by the spring 26. In this position of the valve actuator 25, the pin 42 is so adjusted as to permit the valve 19 to rest upon its seat 18 under the tension of the spring 20. Before describing the operation of the control unit, it will be noted that the free end of the crank arm 35 is connected by a link 44 to the gear-shift lever 16 and that, due to this connection, the crank 35 will be moved whenever the gear-shift lever is moved to any gear selecting position.

The operation of my improved brake control unit is as follows: Whenever the gear-shift lever 16 is in its neutral position (shown by full lines in Fig. 1) the crank arm 35 will be in the position shown in Fig. 2 and the valve 19 will be normally urged against its seat 18 by the spring 20. Assuming the parts to be in the positions just described and that an operator depresses the service pedal 14 to apply the brakes, the brake fluid within the master cylinder 13 will pass therefrom under pressure through conduit 15 to the chamber B of the control unit; thence past the bar 31 and flange 40 to open the valve 19 against the tension of the spring 20; and thence through chamber C of the conduit 15 beyond the unit, to and again into the conduit 15 beyond the unit, to the brake cylinders 5, 6, 7 and 8, which act in unison.

Under the conditions just described, it is unnecessary to retain the service brake pedal 14 depressed in order to retain the brakes in applied position, since any retrograde flow of the fluid medium from the brake cylinders will be instantly checked by the automatic closing of the valve 19 upon its seat 18. It follows, therefore, that with the brakes thus applied, and retained in applied position by the valve 19, it will be necessary to unseat the said valve before the brakes can be released. This is accomplished by moving the gear shift lever to any one of the usual four gear-selecting positions, since such a movement will serve to actuate the link 44 and in turn the crank arm 35 and the associated parts, thereby to cause the unseating of the valve 19, thus permitting release of the fluid medium and its return to the master cylinder 13. When the gear shift lever 16 is in any one of the usual four gear-selecting positions or in any position other than neutral position, the bar 31 of the rock shaft 24 will be in a position to elevate the valve actuator 25 a distance sufficient to cause its pin 42 to unseat the valve 19; thereby to permit free flow of the fluid medium, through the unit, between the master cylinder and the brake cylinders, and vice versa.

From the foregoing described operation of the control unit, it will be observed that, in order to maintain the brakes in applied position during the absence of an operator without utilizing the conventional emeregency brake mechanism, it is only necessary to move the gear shift lever to neutral position before applying the brakes by depression of the service brake pedal 14.

It will be further observed that when the gear shift is in any one of the four usual gear-selecting positions and the vehicle is in motion, application of the brakes through the service pedal 14 may be made in the usual manner; and that when the vehicle is in motion and the gear-shift lever is moved to a neutral position, any application of the brakes thereafter through depression of the service brake pedal 14 will cause the brakes to be applied and retained in applied position until such time as the gear shift lever is again shifted to any one of its gear-selecting positions.

An advantage of my brake control unit resides in the double action of the rock shaft 24, which permits unseating of the valve 19 regardless of the direction in which the gear-shift lever 16 is moved to a gear-selecting position. This is of great importance, and especially so when the unit is installed on delivery trucks, for the reason that should an operator of such a truck lock the brakes in applied position upon leaving his truck and upon his return desire to back the truck instead of proceeding in a forward direction, the act of moving the gear-shift lever 16 into reverse will release the brakes just as effectively as they would be released should the gear shift lever be moved to low position, intermediate position, or high position. The control unit is not only simple in construction but efficient and positive in its action and does not interfere with the customary operation of a motor vehicle. If desired, the housing 17 may be supplied with a bracket 17a by means of which the unit may be mounted and supported from any desirable rigid part of the vehicle such as the frame, dashboard, etc. Still another advantage of the construction shown is that the bar 31 is preferably off-center and that the flat surface 31a of the same produces a dead center effect upon the valve unseating device 25 when the check valve 19 is in closed position. This construction and arrangement of the means for operating the valve unseating device is responsible for the smooth action between the rock shaft and the valve actuator and tends to reduce to a minimum the back pressure of the rock shaft through the influence of the spring 26.

Having thus described my invention, what I claim is:

1. A control apparatus for hydraulic brake mechanism for vehicles comprising in combination brake and gear-shift levers, wheel-brake cylinders, a master cylinder, a conduit connecting said master cylinder and the said wheel-brake cylinders, means operable by the movement of said brake lever for supplying fluid from said master cylinder through said conduit to said wheel-brake cylinders, said control apparatus comprising a housing having a passage extending therethrough and provided with an inlet port connected with said conduit for receiving fluid from said master cylinder and an outlet port connected with said conduit for delivering fluid from said passage to the wheel-brake cylinders, a check valve in said passage for preventing the flow of fluid from the wheel brake cylinders to the master cylinder, means in said passage interposed between the inlet and outlet ports thereof for unseating said valve, and connections between said gear shift lever and said valve-unseating means for operating the latter by movement of said gear shift lever, the said valve unseating means being constructed and arranged to unseat the valve through the movement of said gear-shift lever to any gear-selecting position to which said gear-shift lever is capable of being moved.

2. A control apparatus for hydraulic brake mechanism for vehicles comprising in combination brake and gear-shift levers, wheel-brake cylinders, a master cylinder, a conduit connecting said master cylinder and the said wheel brake cylinders, means operable by the movement of said brake lever for supplying fluid from said master cylinder through said conduit to said wheel brake cylinders, said control apparatus comprising a housing having a passage extending therethrough and provided with an inlet port connected with said conduit for receiving fluid from said master cylinder and an outlet port connected with said conduit for delivering fluid from said passage to the wheel brake cylinders, a check valve in said passage for preventing the flow of fluid from the wheel brake cylinders to the master cylinder, means in said passage interposed between the inlet and outlet ports thereof for unseating said valve, and connections between said gear shift lever and said valve unseating means for operating the latter by movement of said gear shift lever to any gear-selecting position to which said gear shift lever is capable of being moved.

3. A control apparatus for hydraulic brake mechanism for vehicles comprising in combination brake and gear shift levers, wheel-brake cylinders, a master cylinder, a conduit connecting said master cylinder and the said wheel-brake cylinders, and means operable by the movement of said brake lever for supplying fluid from said master cylinder through said conduit to said wheel-brake cylinders, said control apparatus comprising a housing having a passage extending therethrough and provided with an inlet port connected with said conduit for receiving fluid from said master cylinder and an outlet port connected with said conduit for delivering fluid from said passage to the wheel brake cylinders, a check valve in said passage for preventing the flow of fluid from the wheel brake cylinders to the master cylinder, a rock shaft mounted in said housing and having an operating portion presented toward said valve, a valve-unseating member interposed between the said portion of the rock shaft and the said valve, and a connection between said rock shaft and the said gear shift lever whereby rotary movement will be imparted to the said rock shaft by the movement of the said lever to any gear-selecting position to which it is capable of being moved.

4. A control apparatus for hydraulic brake mechanism for vehicles comprising in combination brake and gear shift levers, wheel-brake cylinders, a master cylinder, a conduit connecting said master cylinder and the said wheel-brake cylinders, means operable by the movement of said brake lever for supplying fluid from said master cylinder through said conduit to said wheel-brake cylinders, said control apparatus comprising a housing having a passage extending therethrough and provided with an inlet port connected with said conduit for receiving fluid from said master cylinder and an outlet port connected with said conduit for delivering fluid from said passage to the wheel-brake cylinders, said passage being provided with a valve seat and a check valve cooperating therewith to prevent the return of fluid from the wheel-brake cylinders to the master cylinder, a rock shaft mounted within said housing and having an operating portion located within the said passage between the valve seat and the outlet port, a valve-unseating device, spring means for holding the said device in engagement with the said portion of the rock shaft, said device having a portion adapted to engage the valve and to move the same away from its seat when the rock shaft is rocked in either direction, and means connecting the said rock shaft and the gear shift lever whereby rotary movement will be imparted to the rock shaft by movement of the said lever to any gear-selecting position.

5. In the control apparatus recited in claim 4, the valve unseating device comprising a base member adapted to rest upon the operating portion of the rock shaft and provided with one or more passages for fluid from the master cylinder, a pin adapted to engage and unseat the valve, a spring for holding the said base member in contact with the aforesaid portion of the rock shaft, and a spring normally holding the valve to its seat.

6. A control apparatus for hydraulic brake mechanism for vehicles comprising in combination brake and gear shift levers, wheel-brake cylinders, a master cylinder, a conduit connecting said master cylinder and the said wheel-brake cylinders, means operable by the movement of said brake lever for supplying fluid from said master cylinder through said conduit to said wheel-brake cylinders, said control apparatus comprising a housing having a passage extending therethrough and provided with an inlet port connected with said conduit for receiving fluid from said master cylinder and an outlet port connected with said conduit for delivering fluid from said passage to the wheel-brake cylinders, a check valve in said passage for preventing the flow of fluid from the wheel brake cylinders to the master cylinder, the said housing having bearing seats on opposite sides of the passage therein interposed between the inlet port and the check valve, a rock shaft within said housing extending across said passage and having bearing members mounted in the said seats, said rock shaft having an operating portion interposed between said bearing members, a valve-unseating member interposed between said rock shaft and the said valve and having a base adapted to engage the operating portion of the rock shaft, said base being interposed between the said bearing members and in substantial engagement with one of said members, and connections between said gear-shift lever and the said rock shaft for operating the latter by the movement of the said gear-shift lever.

7. In the control apparatus set forth in claim 6, the valve-unseating member being provided with projections slidably engaging the wall of the passage between the rock shaft and the said valve.

8. In the control apparatus recited in claim 4, the portion of the rock shaft which engages the valve-unseating device producing a dead center effect upon said device whereby the valve will be held to its seat when the device is in engagement with the said portion of the rock shaft.

9. The combination with a hydraulic brake system for vehicles comprising wheel brake cylinders, of a master cylinder having a piston therein, a brake lever connected with said piston and a conduit connecting the master cylinder and the wheel brake cylinders, of a control unit comprising a housing in said conduit interposed between the master cylinder and the wheel brake cylinders and a check valve in said housing adapted to be unseated by the pressure of the fluid being delivered from the master cylinder through said housing to said wheel brake cylinders and to be seated upon a cessation of said pressure, a gear shift lever, and connections between said gear shift lever and the said valve for unseating the latter by the movement of said gear shift lever from its neutral position to any gear-selecting position to which it is capable of being moved.

10. The combination with a hydraulic brake system for vehicles comprising wheel brake cylinders, of a master cylinder having a piston therein, a brake lever connected with said piston and a conduit connecting the master cylinder and the wheel brake cylinders, of a control unit comprising a housing in said conduit interposed between the master cylinder and the wheel brake cylinders and a check valve in said housing adapted to be unseated by the pressure of the fluid being delivered from the master cylinder through said housing to said wheel brake cylinders, a spring for seating said valve, a gear shift lever, valve operating means within said housing, means connecting said valve operating means with said gear shift lever whereby said valve will be seated by said spring when the gear shift lever is in neutral position and will be unseated against the action of said spring by the movement of the said gear shift lever to any gear-selecting position, including the reverse and the backing position of said lever, and means whereby, when the gear shift lever is in neutral position, the valve will be unseated against the action of said spring by depressing the brake lever.

11. In a fluid pressure operated braking system for automotive vehicles, the combination of fluid operated brakes, a master cylinder operatively connected with said brakes, a brake operating lever for applying said brakes, a transmission control device for effecting power operation of the vehicle, a control lever for said transmission device movable to a neutral ineffective position and to one or more other positions for driving the vehicle, means connected in said system including a single valve, and connections between said transmission control lever and said valve for automatically releasing said brakes when said transmission control lever is moved to any power operating position.

12. In a fluid pressure operating braking system for automotive vehicles, the combination of brakes including brake cylinders, a master cylinder operatively connected with said brake cylinders, respectively, a brake operating lever, a transmission control device, a control lever selectively movable to different positions for effecting power operation of the vehicle in either of two directions, means operable by the movement of said brake lever for delivering fluid from said master cylinder to said brake cylinders respectively, means including a check valve for preventing release of the fluid pressure within said brake cylinders except under predetermined conditions, and connections between said transmission control lever and said check valve permitting said check valve to seat when said transmission control lever is moved to a neutral non-operative position and automatically opening said check valve when said transmission control lever is moved to any other position.

13. In a braking system for automotive vehicles, the combination of a transmission device for effecting a driving connection between the vehicle power plant and the vehicle wheels, brakes for the vehicle and means for applying said brakes and holding the same in braking position, a control for said transmission device movable to a neutral position to render the power plant ineffective and to one or more other positions for driving said vehicle, and connections between said brake holding means and said transmission control for preventing release of said brakes except when said transmission control is in a position to render the power plant effective for driving the vehicle in one direction or the other, said brake holding means being rendered inoperative automatically when said transmission control is moved to any position other than neutral.

JOHN M. CAPEN.